Dec. 4, 1928.  
C. ZWEIG  
1,694,090  
REMOVAL OF PETROLATUM FROM OILS  
Filed June 21, 1926
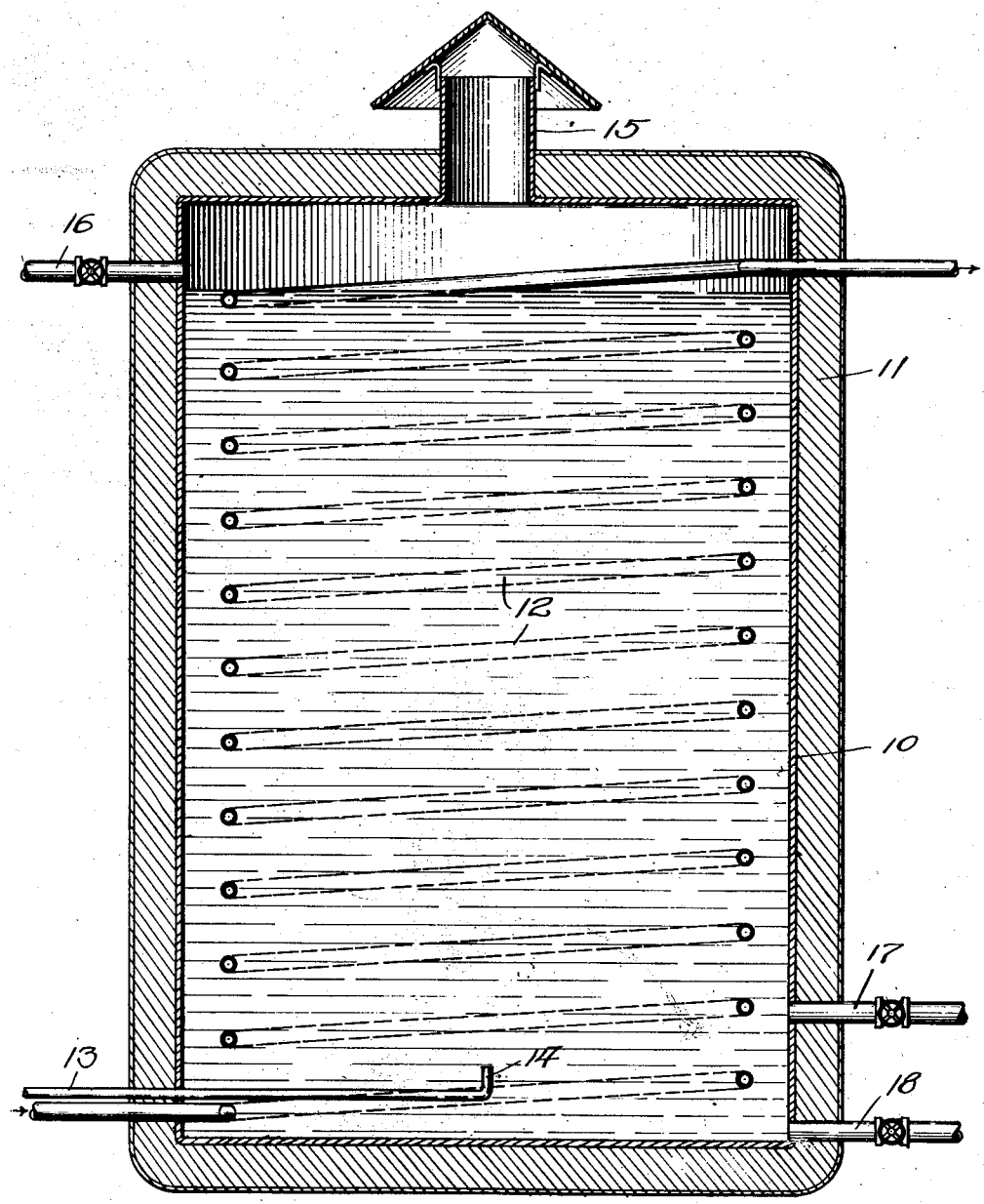
Inventor:  
Charles Zweig, Patented Dec. 4, 1928.

1,694,090

UNITED STATES PATENT OFFICE.

CHARLES ZWEIG, OF WOOD RIVER, ILLINOIS, ASSIGNOR TO STANDARD OIL COMPANY, OF WHITING, INDIANA, A CORPORATION OF INDIANA.

REMOVAL OF PETROLATUM FROM OILS.

Application filed June 21, 1926. Serial No. 117,394.

This invention relates to the removal of petrolatum or "amorphous" wax from oils.

Lubricating stocks which have been produced as a residue by substantially non-cracking distillation, such as distillation with steam, contain petrolatum or the so-called "amorphous wax" which is very difficult of removal, such removal being necessary for the production of oils of desired low pour and solid points.

The petrolatum may be removed by dilution with naphtha or other diluents of low viscosity, reduction to low temperatures and settling at low temperatures for a long time until samples show that the desired pour and solid points have been attained. It has now been discovered that by the application of appropriate agitation to the chilled mixture, the time of settling may be materially reduced, thus effectng very substantial economies in cooling and plant necessary for the desired output of low cold test oil. It is believed that the agitation causes the petrolatum to agglomerate into larger particles which settle with greater rapidity. It may be stated that by the present invention the time of settling may be reduced from over 200 hours to less than 100 hours, other conditions such as degree of cooling, cold test of the products, etc., being about the same.

Instead of shortening the time of settlement, the method may be conducted so as to permit the desired removal of the petrolatum to be effected at a higher temperature than is practicable without agitation, thereby avoiding the necessity of very low temperatures which are costly and difficult to obtain in warm weather.

The accompanying drawing shows a sectional view of an apparatus in which the improved method may be carried out. 10 is a settling tank, which is preferably cylindrical in shape and is heavily lagged as shown at 11. The settling tank is provided with a chilling coil 12 which is supplied with chilled brine or other suitable cooling medium. 13 is an air pipe provided with an open ended vertical portion 14, which is preferably located somewhat above the bottom of the tank 10. The tank 10 is provided with an outlet 15 which opens to the atmosphere and pipe 16 for the supply of oil to be treated, pipe 17 for removal of treated oil and pipe 18 for removal of petrolatum, the pipe 18 being near the bottom of the tank and the pipe 17 somewhat above it.

The improved method will readily be understood from the following description of one particular run. 30 volumes of steam-reduced filtered cylinder stock were mixed with 70 volumes of filter plant naphtha and the mixture fed into the tank 10. The mixture was then rapidly cooled from 78° F. to 12° F. which took about 54 hours. Then air was introduced by pipe 13 for two and one-half hours, thereby thoroughly agitating the contents of the tank. After agitation the temperature was reduced to $-5°$ F., and this temperature was maintained for 92 hours. Thereupon the oil was drawn off, filtered through fuller's earth to the desired color and reduced. The clear oil recovery was 84% of the steam stock. The cold test was found to be 25° F. pour and 22° F. solid. By way of comparison it may be mentioned that operating on similar oil, with the same dilution etc., but without agitation, it was found necessary to settle at $-25°$ F. for approximately 200 hours in order to obtain a finished oil of 25° F. pour.

In the above example, specific conditions have been set forth for the production of an oil of certain definite characteristics. It is readily apparent that the temperature and time conditions of operation may be varied according to the oil under treatment and the desired pour or chill test of the product in a manner similar to the prior settling practice. Furthermore, the agitation may be effected after chilling is completed instead of at an intermediate temperature, as above set forth.

While naphtha has been mentioned as a suitable diluent, it must be understood that other diluents may be used; for example, butyl alcohol, methyl ethyl ketone, acetone, dichlorethane, chlorinated products of petroleum gases and similar solvents and various mixtures of such solvents with each other and with naphtha may be employed.

While air has been mentioned for the purpose of effecting agitation it must be understood that the necessary agitation may be effected in many other ways, for example, by carbon dioxide, nitrogen, hydrocarbon gases or other inert gases or by a mechanical agitator.

It is to be understood that the improved method of removing petrolatum may be applied to both overhead and residual oils containing petrolatum.

It must be understood that the foregoing example is given for the purpose of illustrating the invention and that the invention is not intended to be limited thereby, except by the terms of the appended claims.

I claim:

1. In the method of removing petrolatum from oil which contains it, by diluting and settling at a low temperature at which the wax separates, the step of agitating the diluted oil at a low temperature before settling.

2. The method of producing low cold test lubricants from substantially uncracked stocks containing petrolatum, which consists in diluting such stocks with a suitable diluent, chilling the mixture to a low temperature at which wax separates, agitating the mixture and then allowing it to settle.

3. The method of removing petrolatum from substantially uncracked lubricating stock containing petrolatum which consists in diluting the stock with a suitable diluent, chilling the diluted oil to a low temperature, agitating the chilled mixture by passing gas therethrough and thereafter maintaining the mixture at a low temperature while permitting the petrolatum to settle by gravity.

4. The method of removing petrolatum from steam distilled lubricating stock containing petrolatum, which consists in diluting the stock with naphtha, chilling to about 10° F., agitating the mixture by passing gas therethrough for a few hours, and then maintaining a low temperature for a prolonged period while the petrolatum settles out.

5. The method of removing petrolatum from oil which contains it, which consists in diluting the oil with a suitable diluent, chilling the diluted oil to a low temperature at which wax separates, agitating the diluted oil and thereafter further chilling the diluted oil and permitting the petrolatum to settle by gravity.

CHARLES ZWEIG.